Figure 1:
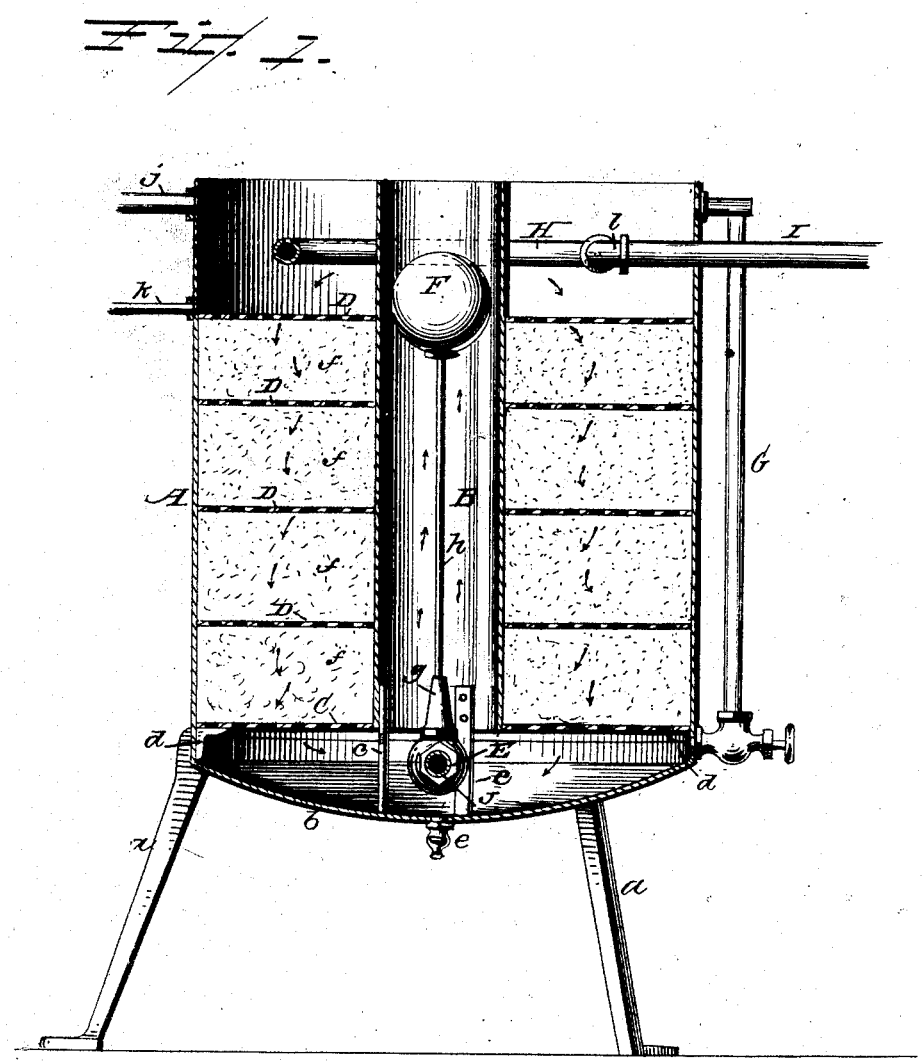

No. 866,454. PATENTED SEPT. 17, 1907.
C. FREIERMUTH & F. H. BLATTNER.
OIL AND WATER SEPARATOR AND FILTER.
APPLICATION FILED MAY 15, 1907.

2 SHEETS—SHEET 1.

Witnesses
John E. Burch
Wm E. Brown

Inventors
Charles Freiermuth
Friedrich Henry Blattner
By Chas. H. Fowler
Attorney

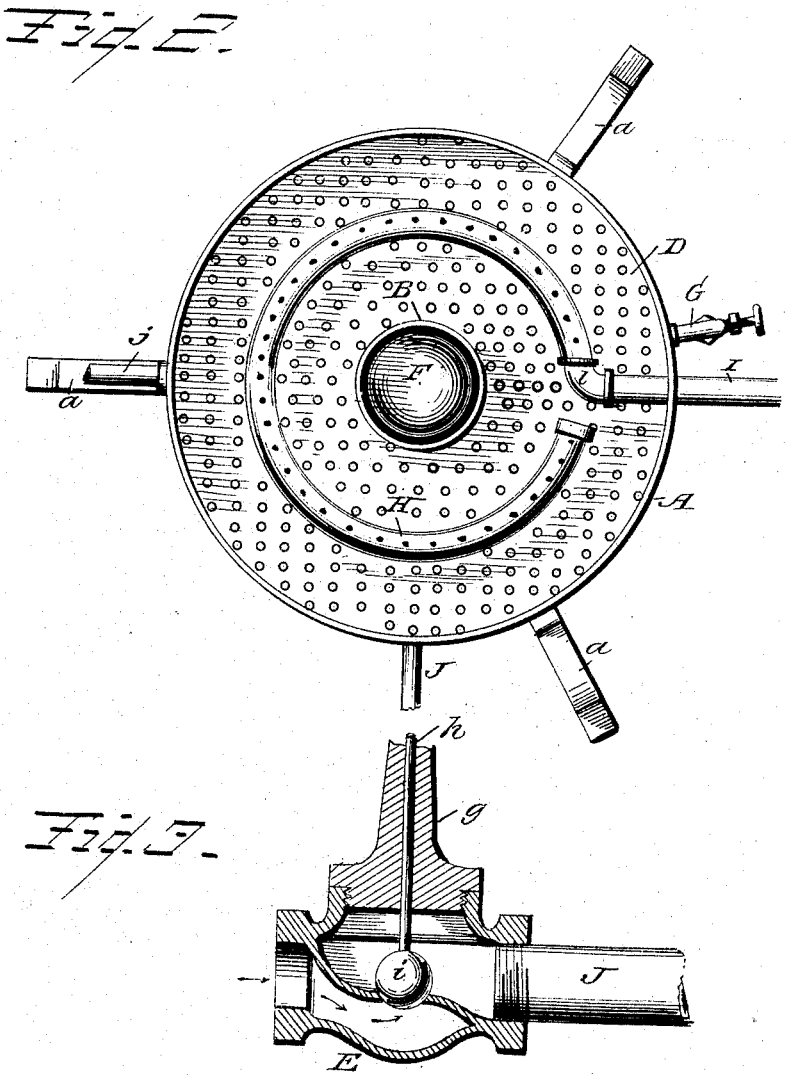

UNITED STATES PATENT OFFICE.

CHARLES FREIERMUTH AND FRIEDRICH HENRY BLATTNER, OF BROOKLYN, NEW YORK.

OIL AND WATER SEPARATOR AND FILTER.

No. 866,454.  Specification of Letters Patent.  Patented Sept. 17, 1907.

Application filed May 15, 1907. Serial No. 378,740.

*To all whom it may concern:*

Be it known that we, CHARLES FREIERMUTH and FRIEDRICH HENRY BLATTNER, citizens of the United States, residing at Brooklyn, in the county of Kings and State of New York, have invented certain new and useful Improvements in Oil and Water Separators and Filters, and do hereby declare that the following is a full, clear, and exact description of the same, reference being had to the annexed drawings, making a part of this specification, and to the letters and figures of reference marked thereon.

The present invention has for its object to provide a simple and effective means for separating the oil and other impurities from steam condensation whereby all the oil and water usually passing into the sewer are saved, thereby reducing the cost in the use of coal and water to a minimum as well as dispensing with the necessity of boiler compounds and removing the danger of boiler explosions on account of a dirty boiler, thus securing the advantage of a filter and purifier that will be perfect in its action, simple in construction, and effective in its purpose.

The invention consists in an oil and water separator and filter constructed substantially as shown in the drawings and hereinafter described and claimed.

Figure 1 of the drawings is a sectional view partly in elevation of an oil and water separator and filter constructed in accordance with our invention. Fig. 2 a top plan view thereof. Fig. 3 a detail sectional view partly in elevation on an enlarged scale of the ball valve.

In the accompanying drawings A represents a tank of suitable dimensions for receiving the water from the condenser or from any other source desired, said tank being supported upon suitable legs $a$ and is open at the top and provided with a convex bottom $b$.

An upright central tube B is located within the tank A and is supported at its lower end by braces $c$ secured thereto and to the convex bottom $b$, said tube being open at both ends.

A supplemental perforated bottom C is suitably secured to the outer side of the tube B at its lower end, and its outer periphery is supported by the brackets $d$ secured to the side wall of the tank.

Above the supplemental perforated bottom C is a plurality of perforated partitions D located between the wall of the tank A and the exterior of the tube B, as shown in Fig. 1 of the drawings. These partitions D are circular and in the form of a disk having a central opening to pass over the end of the central tube B, and between the partitions is a filtering medium as indicated at $f$. The partitions rest upon each layer of filtering medium and are readily removable as hereinafter described whereby a fresh supply of filtering medium may be substituted for the old and the perforated partitions cleaned before being replaced.

At the bottom of the tank A is a suitable drain-cock $e$ and located within the tank below the perforated supplemental bottom C is a ball-valve E of any well known construction, said valve having a vertical guide extension $g$ for the stem $h$ which extends up into the tube B.

The stem $h$ at its lower end is connected to the ball $i$ in the valve-shell and at its upper end is affixed a suitable float F so that the valve will be controlled by the vertical movement of the float through the action of the water in the tube.

A suitable gage G connects with the tank A to indicate the amount of water therein and is also provided with an overflow pipe $j$ which may communicate with the sewer and a drain pipe $k$ which may lead to an oil filter, thereby saving the oil which swims on top of the water; the overflow pipe and the drain pipe communicating with the tank above the upper one of the perforated partitions D, as shown in Fig. 1 of the drawings.

The circular discharge pipe H is located within the tank A and encircles the tube B and has perforations on its upper side for the discharge of the water so that it will flow out evenly over the surface.

The discharge pipe H is connected to an inlet-pipe I by means of a goose-neck or other form of coupling $l$ so that the two pipes may be disconnected when it is desired to remove the perforated partitions D.

The water passing from the condenser or other source into the inlet-pipe I is discharged into the tank A through the perforations in the discharge pipe H and thence passes down through the perforated partitions D and through the filtering medium $f$ and through the supplemental perforated bottom C and up into the central upright tube B as indicated by the arrows in Fig. 1 of the drawings.

To relieve the filtered water, the ball-valve E is provided and operated by a float F connecting therewith as hereinbefore described, and when the water rises sufficiently high in the tube B to raise the float, the ball $i$ upon the lower end of the stem $h$ will be raised off its seat and the valve opened to allow the filtered water to pass through the pipe J to a tank or pump.

The central upright tube B is located wholly within the tank A and its lower end is suitably supported above the bottom of the tank so that a free circulation of the filtered water may pass from the tank into the tube from the lower end thereof, the raising of the tube above the bottom of the tank forming a communication between the two which is essential to a successful operation of the filter.

The lower one of the perforated disks is stationary and it is firmly secured to the tube and forms a brace therefor to retain said tube in a central position with relation to the wall of the tank while the perforated disks above it are removable.

The particular location of the central upright tube with relation to the closed bottom of the tank so that a communication will be formed between the two at the lower end of the tube and entirely inclosing the tube within the tank is considered an essential feature of the invention from the fact that the course of filtered water as it passes down through the filtering medium will take an upward course from the tank into the tube from the bottom thereof as it seeks its own level enabling a perfect filtering action upon the water.

The valve E may be of any suitable construction and may be located inside or outside the tank and operated by any means found best adapted to the purpose.

Having now fully described our invention, what we claim as new and desire to secure by Letters Patent, is:—

1. An oil and water separator and filter, comprising a tank having an overflow and oil drain, a central upright tube supported above the bottom of the tank and inclosed wholly within the same whereby a communication is formed between the tank and the tube at the lower end thereof, a stationary perforated disk secured to the tube at the lower end to form a brace therefor, a plurality of removable disk and a filtering medium between the same, a removable perforated discharge pipe encircling the tube below the upper end thereof, and a valve operating means for allowing the passage of the filtered water to a tank or pump, substantially as and for the purpose set forth.

2. An oil and water separator and filter, comprising a suitable tank having a water overflow and an oil drainpipe, a central upright tube located in the tank, a perforated supplemental bottom secured to the tube, a plurality of removable perforated partitions located between the wall of the tank and the tube, filtering medium between the partitions, a removable perforated discharge pipe encircling the tube, and a float-valve to control the discharge of the filtered water to a tank or pump, substantially as and for the purpose described.

In testimony whereof we affix our signatures in the presence of two witnesses.

CHARLES FREIERMUTH.
FRIEDRICH HENRY BLATTNER.

Witnesses:
JOHN J. MAHONEY,
JOHN REISENWEBER.